United States Patent [19]

Abel, Jr.

[11] 4,000,396
[45] Dec. 28, 1976

[54] INSTANT BREWING POUR-IN INSTANT ELECTRIC COFFEE MAKER

[75] Inventor: Edmund A. Abel, Jr., Rocky River, Ohio

[73] Assignee: North American Systems, Inc., Shaker Heights, Ohio

[22] Filed: Feb. 24, 1975

[21] Appl. No.: 552,337

Related U.S. Application Data

[63] Continuation of Ser. No. 292,440, Sept. 26, 1972, abandoned, which is a continuation-in-part of Ser. No. 221,560, Jan. 28, 1972, abandoned, which is a continuation-in-part of Ser. No. 166,104, July 26, 1971, Pat. No. 3,693,535.

[52] U.S. Cl. .................... 219/314; 99/281; 99/288; 99/304; 219/306; 219/324; 219/328; 222/146 HE
[51] Int. Cl.² ........................................ H05B 3/82
[58] Field of Search ........... 99/280, 281, 282, 283, 99/285, 288, 295, 299, 300, 304, 305, 307; 165/40; 219/296, 297, 298, 299, 302, 303, 304, 305, 306, 314, 308, 323, 324, 328; 222/146 R, 146 NE; 236/93 R, 93 A, 93 B, 101 E

[56] References Cited

UNITED STATES PATENTS

| | | | |
|---|---|---|---|
| 1,235,203 | 7/1917 | Herz et al. | 219/314 |
| 2,467,749 | 4/1949 | Hodsdon | 219/314 |
| 2,926,234 | 2/1960 | Palmer | 219/314 |
| 3,423,209 | 1/1969 | Weber | 99/283 X |
| 3,463,075 | 8/1969 | Wickenberg | 99/304 X |
| 3,711,681 | 1/1973 | Leuschner et al. | 99/281 X |

*Primary Examiner*—J. V. Truhe
*Assistant Examiner*—N. D. Herkapmp

[57] ABSTRACT

A heater unit for heating a quantity of water in a reservoir. The flow of water from the reservoir to the heating unit is controlled by thermally responsive means disposed to be exposed to vapors from the water as it is heated by the heating unit. The temperature sensing means comprises a flat bimetallic member for operating a valve to control flow between the reservoir and heating unit. A pan-like heating unit structure is a well in which a spiral heating element is positioned and a sandpipe forms the outlet for the heating unit and operates to back-water over the heating element. A generally horizontal flow channel receives water from the reservoir and leads the water to the top of the well.

50 Claims, 8 Drawing Figures

INSTANT BREWING POUR-IN INSTANT ELECTRIC COFFEE MAKER

This is a continuation of application Ser. No. 292,440, filed Sept. 26, 1972 now abandoned, which application is itself a continuation-in-part of application Ser. No. 221,560, filed Jan. 28, 1972, now abandoned, which itself was a continuation-in-part of application Ser. No. 166,104, filed July 26, 1971, now U.S. Pat. No. 3,693,535.

The present invention relates generally to pour-in type electrical water heating apparatus, more particularly to so-called instant heat, pour-in electrical water heating apparatus. However, because of particular utility for hot beverage making purposes, the invention will be described in terms of and as embodied in a so-called electrical coffee maker; but it is to be understood that certain major features of the hereinafter disclosed embodiment of the invention have broader utility and application.

For coffee brewing and like hot beverage making purposes, in situations where a water supply connection required for an automatic machine is inconvenient or is unavailable, particular application has been found for the so-called "pour-in" type machine, since pouring in a selected volume of cold water results in delivery of an equal volume of hot water at an appropriate temperature and rate to a brewing or extracting funnel in turn discharging a corresponding quantity of prepared hot coffee to a receiver beaker. In so-called instant heating machines, from a pour receiving tray or reservoir of capacity sufficient to immediately receive the desired maximum pour-in volume, cold water passes through an electric heating device to be heated as it flows to a point of use.

In prior pour-in instant heating type, with which the present invention is particularly concerned, water flows by gravity through a metering tray outlet orifice, over and through a thermostatically controlled electrical resistance heated metal block, and thence through a coffee brewing or extraction funnel to a receiving vessel, or where merely hot water is desired, directly to a receiving vessel. With the usual fixed tray outlet orifice the rate of flow continuingly decreases from an initial maximum rate with the decreasing water level, in order to keep the wattage of the electrical heating element at a level acceptable for general appliance use, while at the same time avoiding too long a cycle time for say a desired eight or twelve cup maximum delivery at the desired temperature, a block, usually a casting of rather large mass has been used, therefore large heat capacity, as a heat reservoir pre-heated to a preset temperature before the water delivery is begun. Moreover, to accommodate control elements involved in obtaining a better thermostat response desired, at times more complex castings have been required in the heating unit block. In other units, attempts have been made to valve the outlet of the heating unit and control it in response to temperatures or to place temperature responsive devices in the fluid flow to control the water temperature by controlling the valve between the reservoir and the heating unit to control water flow over the heating unit. See U.S. Pat. Nos. 2,725,008 and 2,818,010.

These prior art units have not provided compact units nor have they provided fine enough temperature controls and short cycle times for heating a given quantity of water to the proper temperature, particularly when the water is to be used for making coffee.

Accordingly, it is an object of the invention to provide a compat water heating unit particularly suitable for use in coffee brewers.

Another object is to provide a new and improved means for sensing the temperature of the water being heated and controlling the temperature thereof, preferably while maintaining a short-duty cycle and utilizing the maximum heating capacity of the heater.

The above objects and others are accomplished by one or more of the following:

1. Controlling the temperature of the water at the outlet of the heating unit by varying the flow to the heating unit with temperature sensing means which is substantially unaffected by direct thermal contact with the liquid being heated but which senses the temperature in the region of the flow path of the liquid.

2. By disposing the temperature sensing element so as to be exposed to vapors from the water being heated and to use the temperature sensing element to control the flow of water to the heating unit.

3. Utilizing a pan-shaped heating unit having a well which receives the heating element for the water and a generally horizontal channel for receiving water to be heated to lead the water to the top of the well.

4. By using a shallow well-type heating unit having a standpipe arrangement at the discharge and causing water to back-up over the heating unit, preferably with a drainage opening to allow the well to drain and also to establish a continuous flow through the heater.

Other objects and advantages will appear from the following description of a particular embodiment and the drawings wherein:

GENERAL ARRANGEMENT

Figure 1:
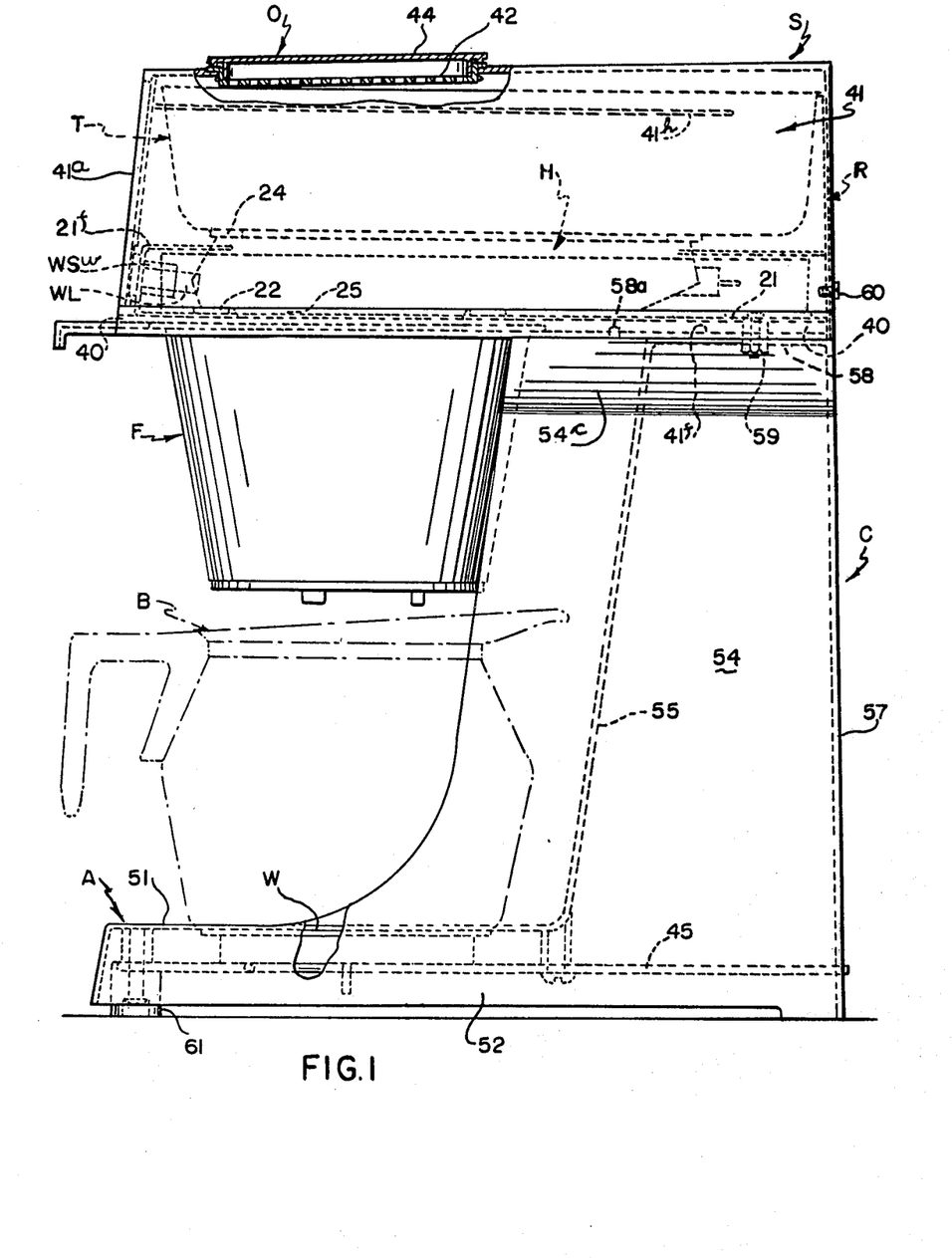
FIG. 1 is a side elevational view of a coffee brewing machine embodying the present invention, with certain parts broken away for clarity of representation.
Figures 2, 3, 4:
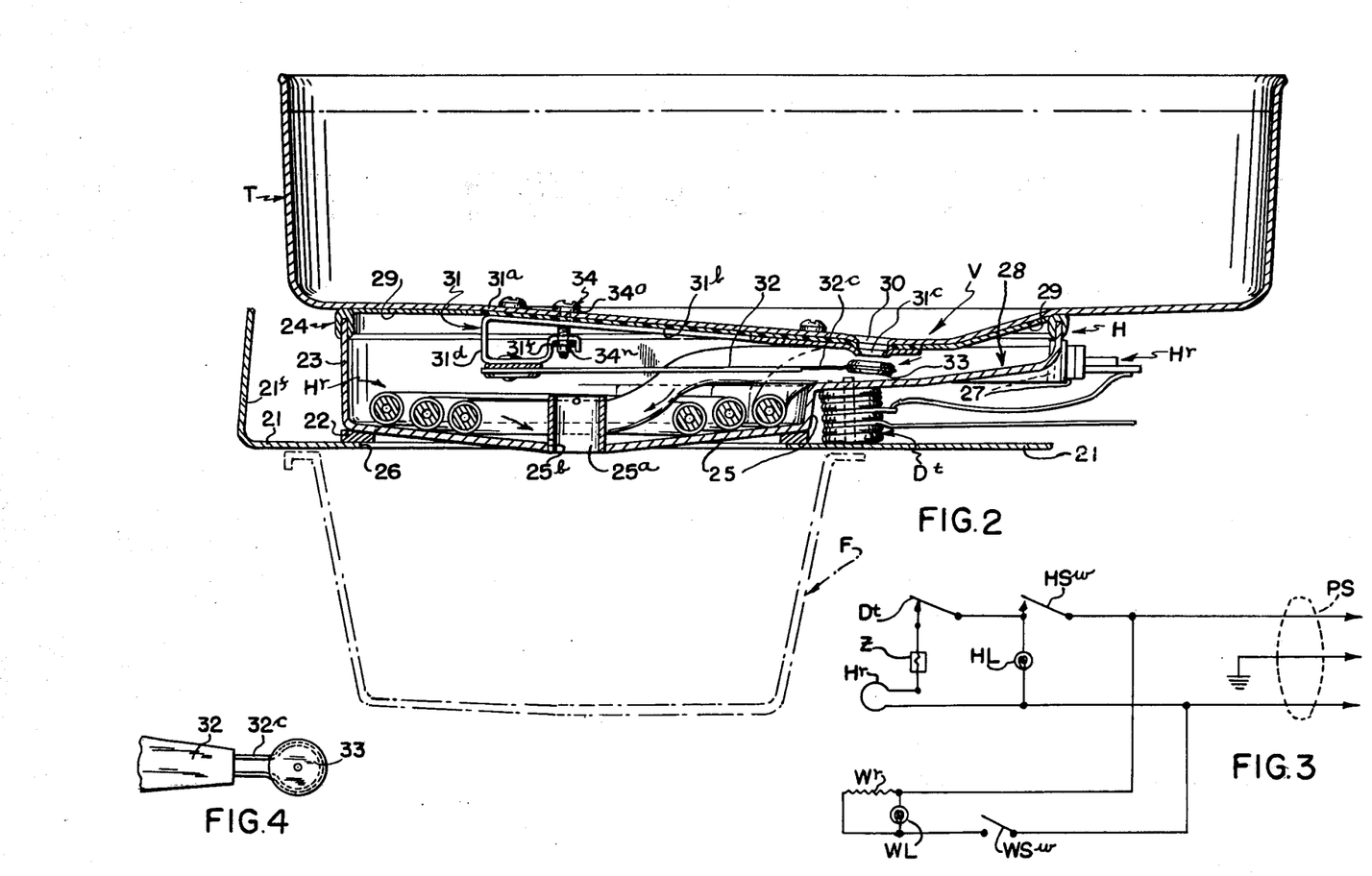
FIG. 2 is an enlarged vertical section taken generally centrally and longitudinally through the heating unit, the bottom of the water reservoir tray, and an orifice valving system.
FIG. 3 is a schematic electrical diagram for the apparatus.
FIG. 4 is an enlarged detail of the valving member mounting.

The particular embodiment of the present invention appearing in the drawings (see FIGS. 1 and 2) comprises, as principal components, a housing structure including a pedestal element providing integrally an extended horizontal base portion A with a vertically extended back column portion C, and supported on the pedestal, a top shell or hood element S; in the base, a warmer plate W for a product coffee receiving beaker B, above which a brewing funnel F is slideably, insertably and removably supported in the bottom of an over-hanging front part of the hood S; and within the hood, a generally rectangular pour-in reservoir tray T, the major part of appropriate electrical wiring for control elements, as represented by schematic FIG. 3, and an electrical resistance type water heater unit H, to discharge hot water downwardly into funnel F. The tray T, preferably a drawn sheet metal structure, say of aluminum, has a capacity to receive a desired or rated maximum of water poured in through the hood top opening structure O; and its bottom has an elongated central depression symmetrically sloped from the sides to a discharge bottom orifice 30 rearwardly offset on the longitudinal center line and provided with a variable orifice or valving structure V (see FIG. 2) controlling water gravity feed to the heater unit as hereinafter described.

HEATING SYSTEM SECTION

The structural and functional relations of the tray T, the heating unit H and associated co-operating parts are best seen from the generally central longitudinal section of FIG. 2.

The unit H comprises a contoured metal body or basin Hb, e.g., of aluminum or a stainless alloy, roughly symmetrical about a longitudinal center-line and preferably drawn of sheet metal to a shape accommodating a resistance rod type heating element Hr; and is supported on and secured to a formed sheet metal support or hood bottom plate 21, with an interposed sealing and insulating flat Silicone composition bottom gasket 22, disposed about the edge of a large plate opening 26.

Water reservoir tray T is supported on the rim of a circumscribing vertical basin side wall 23 through an interposed fitted-on Silicon top gasket 24; and the basin in turn is secured to the plate 21 by appropriate means, as screws through L-shaped lugs, rivetted on, or clips hooked in top edge notches of, side wall regions of the basin. The basin includes a relatively deep-drawn front circular well 25 to which slopes the bottom of a shallower, broad, roughly rectangular channel 28 formed as a rearward extension from the well; and the shallow cone-shaped bottom of the well in turn slopes to a central aperture in or about which is secured or formed a short tubular standpipe 25a. Generally centered about the latter in the well is a flap spirally coiled heater element portion; and the pipe serves both to establish a water level in the well also as a hot water discharge orifice to the funnel F centered therebeneath. At least one small drain hole 25b is provided at the juncture of the well bottom and the tube 25a to drain the well dry at the end of an operating cycle.

The spiral formed portion of the heating element in the flow path preferably has its turns downwardly offset from the flatness toward conformation though not necessarily into contact with the conical bottom of the well. The ends of the spiral portion are offset upwardly and brought out in parallel legs above the maximum designed water level in the well, which, for electrical connections external to the basin, extend back to penetrate the basin at an end location at one side of the channel 28, where water does not normally reach; but temperature resistant seal grommets 27, for example, of a Silicone composition, are preferably used surrounding the heater element legs and engaging the peripheries of the apertures in the basin wall through which the heater element ends pass.

As appears from FIG. 2, the convergently sloped bottom wall of the tray T serves not only to direct the final drawings of contained water towards its discharge orifice 30 centered above the left or inward part of the basin channel 28 as the inlet point of the basin, but also on its sloping under surface guides steam condensate to the low region of the orifice, and hence to the sloping channel 28. Thus, water runs by gravity with continual opportunity for heat transfer from the inlet point along channel 28 into the well 25 and over the spiral turns of the heating element to discharge over the top edge of 25a downwardly onto ground coffee suitably retained in the brewing funnel F. Preferably, to minimize the radiant and vapor heat transfer from the heating section to the tray water, the tray bottom wall bottom surface is covered by a thermally insulating layer 29, of cellular plastic or the like having a metallized reflective facing, to concentrate the developed heat on the water flowing through the heating basin.

A thermal limiting switch or thermostat Dt is secured in good thermal contact externally on the heater basin bottom below the water entrance region of the channel 28, so that the switch quickly responds, if open, to turn on when water begins impinging upon the heater basin, or to open upon temperature rise in that region, say above 150° F. Adjacently there is located a thermal limiter or heat fuse Z (see FIG. 3) electrically connected between the thermostat and one end of the heater element Hr.

ELECTRICAL SYSTEM

For the electrical system shown in FIG. 3, switches and associated pilot lamps for the warmer plate W and the heater H may be supported for alignment in or with respective apertures at the bottom margin of the hood front face panel 41a by mounting in the hood floor plate front flange 21f. This electrical system comprises the warmer plate switch WSw and an associated pilot light WL, with warmer plate resistance Wr connected in a warmer circuit branch across the main power leads of a three-wire grounded power supply cord PS; and further across the main leads, in a series circuit, the heating unit resistance Hr, a thermal limiter safety device or thermal fuse Z, the thermostat Dt, and the heater unit switch HSw, with the pilot light HL of the latter in parallel with Hr, Dt, and Z. The lamps HL and WL are typically connected to light for the "on" condition of their respective switches.

The reflection or back fold on the upward front edge flange 21f of the support plate 21, also an inward horizontal projection of the insulating plastic T-section housing back cover plate R appropriately cover terminals or other exposed conductive elements of the wiring in all normal use or cleaning of the apparatus.

FLOW CONTROL VALVE V

In the aforementioned orifice valving structure, the principal elements (see FIG. 2) are a body or bracket element 31 of a suitable strip metal stock formed as to the shape shown to provide an elongated base 31b secured centrally longitudinally, with a thin interposed thermally insulating and gasketing strip 31a, on the tray bottom and having an actual valving orifice 31c aligned with tray aperture 30; a bimetallic strip type thermally responsive arm 32 with one end secured to an integral bracket portion 31d of element 31 inwardly reflected in spaced relation to the base 31b and at its other end carrying a valving element 33 to swing essentially vertically shiftably toward and away from the orifice 31c. The latter may be provided by punching a sized aperture (as the effective valved aperture of the tray bottom) in the center of a conical dimple coined downward in the end of the strip 31b to a shape providing a top concavity generally conforming to a local tray well depression about the tray aperture 30 for sealing thereto by the aforementioned thin elastomeric strip locally perforated to serve here as gasketing, and also affording a projecting margin about the orifice 31c and hence small area for seating of the valve member 33. Arm 32 is disposed entirely above the basin operating water level.

Valve member 33, a disk of plastic or elastomeric material adapted to seal against the bottom edge of the orifice 31c under the action of arm 32, is circumferentially edge-grooved to engage in a supporting circularly formed stiff wire loop 32c carried out into parallel end legs (see FIG. 4) spot welded to the free end of arm 32, so that the disk is well spaced, say ¾ inch outboard of the arm end, with the opposite end of arm 32 riveted to 31d (preferably in an insulating connection). Thus the bracket is thermally insulated from the tray and also the arm 32 from the bracket, and the bimetallic arm portion is well spaced from the path of water flowing out of the valve orifice providing a structure minimizing thermal disturbance of the valving arm originating from the tray and water not yet encountering the heater.

The valving disk 33 may be imperforate, but preferably has a small central aperture say about 1/16 inch diameter, to afford a limited flow even when the valve disk is seated; so that the tray bottom may be considered to have an aperture controlled from a minimum effective orifice size to a large size by thermal response.

A simple control point temperature setting arrangement, accessible from the top even though the pour-in opening with the tray in place, is afforded by a setting scew 34, extending through a seal washer 34a, aligned apertures of the tray bottom, of the Silicone strip 31a, of base 31b, and of a short inverted trough-shaped upward extension 31f of the bracket arm 31d; the screw being threaded into a nut element 34n, captive in the inverted trough. Screws (unnumbered) similarly passed through respective seal washers, tray bottom and strip apertures, and threaded into base 31b near its opposite ends, secure the valve unit to the tray. With the bracket portions 31d, 31f assembled pre-stressed by the adjusting screw arrangement, the position of arm 32, hence disk 33, is adjustable at a given temperature by the screw setting flexing the bracket portion 31d on which 32 is mounted.

As the disk 33 is mounted in the valve structure as a unit in proper cooperative relation to 31c, without critical positioning required relative to the tray aperture this valve unit structure is preferable to the alternative of valving by a disk or member engaging directly with the margin of an orifice in the tray bottom wall, for the cooperating parts, seat and shiftable valve member can be pre-assembled independently of the larger tray structure and so serviced and replaced.

HOUSING STRUCTURE

The housing is comprised primarily of molded plastic elements; the pedestal integrally providing the aforementioned base and column portions A, C; and the hood S, provided by a generally rectangular hollow plastic casting 41 molded with an open bottom and open back end, closed respectively the the metal plate 21 and by a T-section back plate R; a snap-in grill or grating element 42 retained in a square molded frontward opening in the flat top panel and in turn covered by an inset lid 44 easily removable for filling at the pour-in opening structure O; and the warmer plate support bracket 45; all being molded plastic excepting bracket 45 and plate 21. Warmer plate W is conventional and clamped on 45.

A rectangular open bottomed pedestal base A is defined by a flat top wall 51 and, dependent therefrom, at the front, back and sides, a skirt 52 peripherally continuous about all the four pedestal sides; three bosses being integrally molded in the recessed bottom for screws mounting the roughly triangular formed steel wire bracket 45 at the base opening and also two bumper type feet 61 within the respective front corners. At the back of the pedestal feet are provided by downward local skirt projections near the respective back corners. In the column C, slightly upwardly convergent and tapering side panels 54, with forwardly curving bottom ends merging into the skirt sides, are connected at their front edges by an upwardly backwardly sloping forwardly concave joining portion 55, and at the rear of by what might be considered a downwardly notched back panel 57, sloping slightly forwardly upwardly from a bottom margin constituting the back side portion of the base skirt.

Just short of the top of the column the side panels 54 terminate in inwardly breaking, that is more sharply convergent, narrow portions 54c from which extend respective coplanar horizontal inward flanges 58 elongated fore and aft to join adjacent top edge portions of the concave front and of the lateral arm portions of the V-notched back panel.

Opposed coplanar inward longitudinal bottom flanges 41f on the casing sides are bonded, by adhesive or otherwise, along their back portions to the flanges 58, thereby to secure the hood on the pedestal. Preferably integral aligning pins 58a on 58 are received in corresponding apertures in flange 41f.

Along the bottom of the forwardly over-hanging part of the hood, the bottom flange 41f, the lateral margins of plate 21 and interposed spacer strips 40 narrower than flanges 41f, define respective opposed lateral slots to receive slidingly a flat projecting supporting rim lip of the brewing funnel F inserted from the front under the bottom edge of the integral recessed front face panel 41a. The fronts ends of the strips 40 are rounded or tapered to form a funnel lip guiding slot mouth. (Similarly may be received the rim lip of a simple discharge funnel used when merely hot water is to be discharged).

In the upper region of the casing 41, horizontal longitudinal inward flanges 41h are integrally molded on the sides as tray locating or spacing guides.

The plate 21 by conventional punching, shearing and forming operations is fabricated with required apertures and with upward flanges for rigidity and mounting purposes, namely, the aforementioned front flange 21f, side flanges 21s and rear flange 21r. The plate 21 aptly serves as a sub-assembly chassis carrying the heating unit H secured thereto by basin-engaging clips screw-secured to the plate, the switches and lamps secured in the front flange 21f, the power cord PS anchored in the plate flanges and already connected to the lamps, switches, power cord, heater element and its associated thermally responsive elements.

After the hood shell 41 is mounted on the column, and preferably the feet and the warmer plate and bracket assembled in the base, the warmer plate leads are connected, and the plate 21 is merely slid into the open hood back to bring the switch levers or actuating element through the respective hood front panel openings. The plate then being supported against upward displacement by engagement along the top edge of the flange 21f with a transverse flange of the shell front panel 41a, and at the back portion through bonded spacer strips 40 on column top 58, it is finally simple secured by screws 59 passed through the plate 21, the spacers, and the shell flanges 58 and nuts beneath the latter.

Thereafter the tray T is inserted, and the back cover R is applied and secured to plate rear flange 21r by a plurality of sheet metal screws 60. The V-shaped opening in the back through which the power cord is taken also affords a convenient cord storage opening.

It should be observed that the shoulders arising by the shell bottom flange 41f projecting outwardly beyond the flanges 58 afford a convenient grip or finger hold for handling the machine from above.

WATER HEATING OPERATION

The general manipulations of the apparatus for coffee brewing or beverage service being conventional, only the pour-in water heating cycle is considered.

By way of example, there may be considered a coffee brewing machine having structure similar to that represented in the drawings, where the drawn sheet aluminum basin is provided with a resistance heater rod of a wattage rating of 1550 watts, operating on a nominal 118 volt A.C. supply, and an eight cup (48 ounces) rated capacity with a tray about 2-inch deep.

The delivery cycle time to empty the tray and drain the basin to the funnel F is a nominal 4 ½ minutes, with a 0.067 inch disk orifice and a valve orifice 32 of about 3/16 inch diameter, with the tray filled with eight cups of 60 F water and the average temperature of the water delivered to the funnel F about 195 F.

Within 5 or so seconds after the main brewing switch HSw is turned on and the tray filled through opening O, hot water is being delivered from the heating unit. Initially a light flow occurs through the disk orifice, but radiant heat from Hr and hot vapor from the water, by heating arm 32, open valve V somewhat allowing a greater water flow to the basin. Optimally the thermal valve has an aperture size providing upon an initial opening an effective flow area allowing a water flow in the early part of the cycle which is sufficient to absorb substantially all the heat produced by the heater element operating at its nominal power rating even after the flow environment is warmed by an initial heated water flow.

Obviously with the dropping water level in the tray T, the pressure is continually decreasing, so that were there a constant opening, i.e., a fixed effective flow orifice, the flow would be continually decreasing, hence the discharge water temperature would rise, and finally considerable steaming and boiling ensue. But here the tendency to a temperature rise in the basin space and the heater unit environment, which the bimetal arm 32 is exposed to and sensing, and the temperature rise of the arm with time, cause a corresponding valve-opening deflection of arm 32 to compensate for the flow-decreasing pressure drop and produce the desired discharge water temperature, permitting and achieving a good utilization of the heater element rating or heating capacity throughout each pour-in operation cycle. The screw 34 is appropriately set, so that the flowing water is heated to discharge through tube 25a to the funnel F at the brewing temperature desired, generally about 195°-205° F.

The preferred use of the perforated rather than solid valve disk conduces to an earlier and better regulated delivery of the desired hot water.

At a point in the cycle when no water discharges from the tray into the channel 28 to maintain the well level and the discharge over the top overflow pipe 25a, with drainage only occurring through 25b, and with cool water from the reservoir no longer impining on the basin directly over the thermostat or limiting thermal switch Dt, the consequent rising temperature of the water, hence of the basin, is quickly sensed by thermal switch Dt, which cuts off power to the heater. As well this limiter switch may come into operation at an earlier point in the cycle, for example, if valve V does not open promptly in the initial part of the cycle, thus preventing excessive temperature "over-shoot" of the heating section; in such event, because of its sensitive location, Dt promptly closing in response to valve opening as the increased water flow impinges in the channel 28 directly above the point whereon switch Dt is mounted. Switch Dt is set to remain closed, hence keep a constant water-heating power on without interruption as long as water is flowing from the reservoir onto the basin channel 28 above the switch mounting point. A setting of this switch to open at 150 F was found appropriate for one apparatus as here represented and described; but a settling point is empirically established for the specific structure involved to afford an uninterrupted heating power application. The minimum water heating cycle time is obtained by setting the thermally responsive valve and the switch Dt so as to apply uninterrupted constant power during the water heating cycle operation.

The flow is thus regulated to utilize the full rated wattage of the heater element throughout the operating heating cycle while yet producing the desired water temperature.

Further this arrangement automatically accommodates to normally expected fluctuations in the supply line voltage and the resultant power as well as variations in the temperature of the water poured into the reservoir tray. The manipulation is a simple "turn-on, pour-in" operation as far as the user is concerned, requiring no waiting for a warm-up ready signal to move from one step to another in an operational sequence. Use of the thermal barrier in localizing the water heating to the relatively small volume in the flow path and minimizing loss to the tray water promotes early fast flow of hot water. Moreover, since the flowing water is heated by direct contact with the formed resistance heating element, and the heater unit basin is of comparatively small mass, there is relatively little heat loss in structure remaining at high temperatures after the water heating cycle is completed.

It will be further appreciated that the temperature sensor for the heater element may be in direct contact with the heater to provide a quick response.

Figure 5:
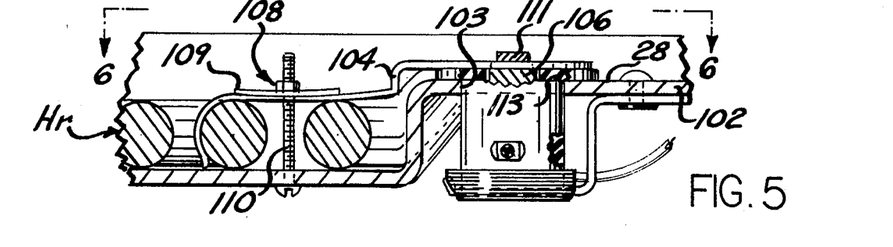
FIGS. 5, 6, 7, and 8 are fragmentary views of a modification showing a modified thermal limit switch arrangement and valve actuator.
Figure 6:
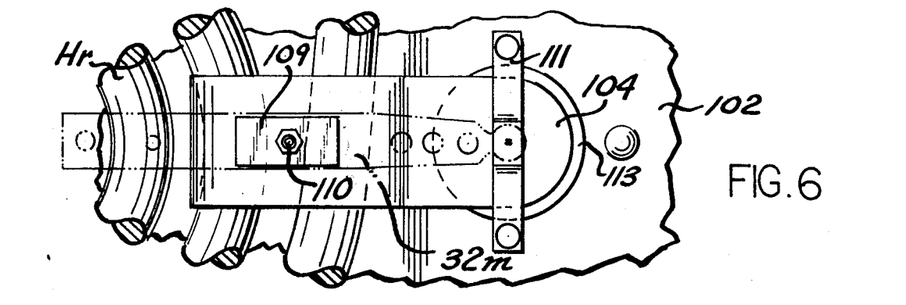

FIGS. 5 and 6 illustrate a preferred arrangement for the thermal limiting switch Dt for controlling the energization of the heater coil Hr. The thermostat Dt is encapsulated with heat insulating material and is received in an opening 103 in an upwardly displaced portion 102 of the heater pan which provides the channel or ledge 28. The thermostatic switch Dt has an exposed metal portion which engages heat conductor plate 104 disposed above the displaced portion 102. The heat conductor plate 104 extends over and engages with good thermal contact two of the coils of the heating element Hr and is held in position by clamp 108 including a clamp member 109 and a clamp screw 110 and by a clamp bar 111.

The heat conductor plate is disposed below the bimetal valve actuator to shield the main portion of the actuator from direct radiation from the heating element. A modified form 32m of the bimetal actuator 32 is shown in dot-dash lines in FIG. 6 to illustrate the shielding action of the plate.

The heat conductor plate 104 provides excellent thermal transfer to the thermostatic switch Dt so that the switch will respond quickly to the temperature of the heating element. The thermostat switch is set so that it will de-energize the heating element when it rises to a temperature which indicates the absence of water in the heating unit, i.e., a dry condition. This will occur even though the temperature of the pan and other metal parts has not so risen. To this end, a heat insulating gasket 113 is disposed under the heat conductor plate 104 and around the metal portion of the thermostat which engages the conductor plate 104.

Preferably, the thermostat is located under the aperture 30 so that the water from the reservoir has a cooling effect on the thermostat through the heat conductor plate 104. This enables the thermostat to be set at a lower temperature for indicating a dry condition than would be the case if the thermostat were not cooled by the inlet water thus enabling a "dry condition" to be indicated at a lower temperature for the heater pan, etc., as compared to the situation where the thermostat is not cooled by the inlet water.

Figures 7, 8:
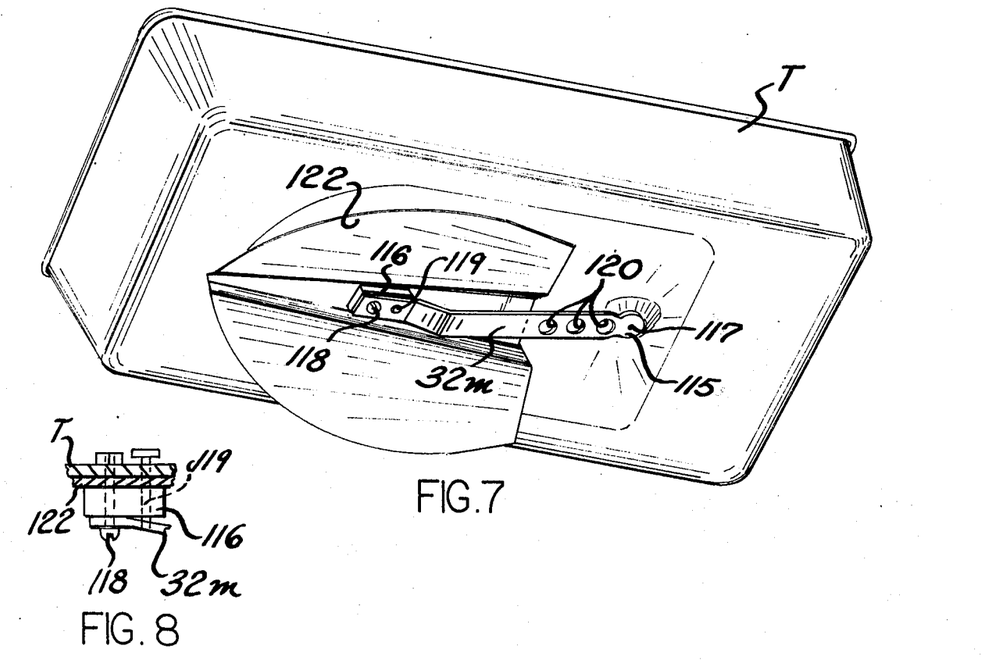

The bimetal actuator 32m shown in dot-dash lines in FIGS. 5 and 6 is better illustrated in FIG. 7. FIG. 7 also illustrates a modified mounting, a modified heat barrier between the reservoir and heating unit, and a modified inlet valve. As shown therein, the shiftable valve element is formed as a valve part 115 on one end of the bimetal member 32m and operates to directly seat against the portion 114 of the bottom of the reservoir T at the aperture 30 to control water flow from the aperture. The valve part 115 has a small opening 117 therethrough to provide a flow of water to the heating unit with the valve closed.

The end of the bimetal 32m remote from the valve part is clamped against a heat insulating block 116 between the bimetal and the bottom of the reservoir by a mounting screw 118. The screw 118 extends through the block 116 and the bottom of the reservoir, see FIG. 8. An adjusting screw 119 corresponding to the adjusting screw 34 is also provided.

The bimetal member has holes 120 therein to provide a thermal insulating effect due to water which directlY contacts the valve end of the bimetal as the water flows from the reservoir to the heating unit. This will allow the bimetal to be substantially unaffected thermally by contact with water in the flow path.

FIG. 7 also has a heat barrier in the form of a reflective metal heat shield 122 which aids the response of the bimetal and forms a heat barrier between reservoir bottom and the well. The shield is formed to provide an air space between the shield and reservoir bottom except along the central portion where it is secured to the reservoir bottom.

What is claimed is:
1. An instant heating electrically powered water heating apparatus comprising:
an electrical resistance heated type water heating unit providing therein a water heating gravity flow path from a unit water inlet point to a discharge region,
a water reservoir to be filled with a quantity of water to be heated and having an outlet through which water is gravitationally fed to said water inlet point,
and actuating means including a temperature sensing element for controlling flow of water from said reservoir to the said inlet point of the heating unit to control the temperature of the water heated by said unit during a reservoir discharge cycle and means supporting said element so as to be substantially thermally unaffected by contact with the controlled water flow but in a position to sense the temperature in the region of said flow path.

2. Apparatus as described in claim 1 wherein: the reservoir outlet includes a reservoir bottom wall aperture and said actuating means including a temperature sensing element comprises a bimetal member having a valve part carried at the outer end thereof, said valve part being shifted by said bimetal member to vary the effective flow area of said outlet by a shift of said valve part, and said bimetal member sensing the temperature of the region of the water flow path to shift the valve part to increase flow area with increased temperature in said region of the water flow path.

3. Apparatus as described in claim 2 wherein: said bimetal member is supported by said reservoir.

4. An apparatus as defined in claim 2 wherein said temperature sensing element is exposed to vapors from water flowing through said heating unit to provide an effective heat transfer to the temperature sensing element.

5. In a water heating unit, as defined in claim 2 wherein said heater unit comprises an exposed rod type heating element below said temperature sensing element and a radiation shield is disposed between said reservoir and said temperature sensing element.

6. In an apparatus as defined in claim 2 wherein a heat conducting member engages said heating element and said apparatus further comprises a thermostatic switch thermally insulated with respect to said heating unit but having good thermal transfer contact with said heating conducting member for de-energizing said heating element when the thermostatic switch senses a predetermined temperature.

7. Apparatus as described in claim 1 wherein: said heating unit includes a basin providing an upwardly open cavity comprising a deeper portion as a well having a central outlet as said discharge region and a shallower portion as a channel sloping to said well from a point disposed at said inlet point under the water reservoir outlet thereby providing said flow path from the inlet point to the discharge region, and said heating unit comprises an electrical resistance rod type heater element comprising a portion formed as a coil in said well disposed in said flow path.

8. Apparatus as defined in claim 7 wherein: said coil is a spiral generally centered around said central outlet, and
said central outlet includes a standpipe opening through a central aperture in the well bottom to establish a water level covering said spiral; and
aperture means of small size relative to the standpipe flow area and the normal flow of water is provided to enable a continuing flow of water from said well and for draining said well adjacent the standpipe.

9. Apparatus as described in claim 7 wherein: said reservoir forms a closure for said cavity and a thermal barrier is provided between the bottom wall portion of said reservoir and the area of said cavity for which it forms a closure.

10. Apparatus as described in claim 7 wherein: the bottom surface of said reservoir overlying said basis is provided with a thermally insulating and reflective covering facing toward said cavity.

11. Apparatus described in claim 1 wherein said actuating means comprises: valving sub-assembly above said flow path including a bracket element having an aperture therethrough at one end secured on and sealed to the reservoir bottom external surface with said aperture aligned with a reservoir bottom opening to form the reservoir, outlet, said temperature sensing element comprises a bimetallic arm element with one end secured to the other end of the bracket element and a shiftable valving element carried by the other end of the arm element to vary the effective flow area of said outlet by a shift of said valving element upon thermal response of the bimetallic element sensing temperature of the region of the water flow path to increase the flow area with increased temperature in said region.

12. An apparatus as described in claim 1 wherein said temperature sensing element is a bimetal member.

13. An apparatus as described in claim 12 wherein said bimetal member is mounted on the bottom of said reservoir and said actuating means further includes a valving element mounted at one end of said bimetal member.

14. An apparatus as defined in claim 1 wherein said temperature sensing element is exposed to vapors from water flowing through said heating unit to provide an effective heat transfer to the temperature sensing element.

15. An instant electrically powered water heating apparatus comprising an electrical resistant type water heating unit providing therein a water heating gravity flow path from a water inlet to a discharge region,
 a water reservoir to be filled with a quantity of water to be heated and having a reservoir outlet in which water is gravitationally fed to said water inlet,
 and actuating means including a temperature sensing element for controlling flow from said reservoir to the inlet point of the heating units to control the temperature of the water heated by said unit during a reservoir discharge cycle as the water flows through the heating unit,
 said actuating means including a reservoir outlet valving subassembly above said flow path and comprising:
 a bracket element having an aperture therethrough at one end secured on and sealed to the reservoir bottom external surface with said aperture aligned with a reservoir bottom opening to form said reservoir outlet,
 a bimetallic arm element with one end secured to the other end of the bracket element,
 and a shiftable valving element carried by the other end of the arm element to vary the effective flow area of said outlet by a shift of said valving element upon thermal responses of the bimetallic element sensing temperature of the region of the water flow path to increase the flow area with increased temperature in the region.

16. Apparatus as described in claim 15 wherein: said sub-assembly is thermally insulated from said reservoir by means including a non-metallic strip sandwiched between said bracket and the reservoir bottom.

17. Apparatus as described in claim 15 including means for adjusting the temperature at which said valving element begins to recede from said aperture.

18. Apparatus as described in claim 17 wherein: said bracket element comprises a metal strip having a portion as a base secured flat to the reservoir bottom and having its said other end formed downwardly and reflected inwardly to provide a portion offset from the base for securement of the bimetallic element; and the adjusting means comprises a sealing washer on the reservoir inside bottom surface, and a headed screw passed through the washer and aligned holes in the reservoir bottom and in said base and into a threaded engagement with the offset portion of the bracket, whereby the offset portion and therewith the valve element carrying bimetallic arm may be variably stressed to change the temperature at which the valving element begins to recede from said aperture.

19. Apparatus as described in claim 15 wherein: said valve element comprises a disk engageable flatwise over said aperture; said disk carried by and in spaced relation to the bimetallic arm end, through a formed wire having a loop engaging in a circumferential disk edge groove.

20. Apparatus as described in claim 15 wherein: said valve part comprises a portion engageable flatwise over said aperture,
 said valve part being perforated to provide, when the disk is engaged across said aperture, a reservoir outlet minimum flow area smaller than the area of the aperture.

21. An apparatus as defined in claim 15 wherein said bimetallic arm element is exposed to vapors from the flow of water through said heating unit to provide an efficient heat transfer through the bimetallic element which indicates the temperature in said region.

22. A water heating apparatus comprising a flow-through heating unit having an inlet for receiving water which is to be heated while it flows through the heating unit to a discharge outlet for discharging heated water for use, said heating unit comprising a member defining a pan providing a horizontal heated flow path from said inlet to said discharge outlet for heating the water as it flows through the unit, said inlet being disposed above said outlet and the water flowing from said inlet along said heated flow path to said outlet and being discharged by gravity flow and a heating element combined with said pan for heating the unheated water as it flows through said heating unit along said flow path and is discharged at said outlet, said pan comprising a basin providing an upwardly open cavity comprising a deeper portion as a well which has a central outlet as said discharge outlet and a shallower portion as a channel sloping to said well from said inlet thereby providing a flow path from the inlet to the well and then to said discharge outlet, and said heating element comprising an electrical resistance rod type heater element comprising at least a portion formed as a flat coil in said well so as to be disposed in said flow path.

23. An apparatus as defined in claim 22 wherein said coil is a spiral generally centered around said central outlet, and said central outlet includes a standpipe opening through the central outlet in the well bottom to establish a water level covering said spiral; and aperture means of small size relative to the standpipe flow area and the flow of water being heated and discharged is provided to enable a continuing flow of water from said well and for draining said well adjacent the standpipe.

24. A water heating apparatus as defined in claim 22 and comprising flow control means for controlling the flow of water to said inlet and varying the supply of water flowing through said heating unit to control the temperature to which the water is heated as it flows therethrough.

25. An apparatus as defined in claim 24 wherein said apparatus includes means responsive to the temperature in the area of said flow path for varying the flow of water to said inlet.

26. An apparatus for heating water comprising a reservoir for receiving a quantity of water to be heated, a heating unit under said reservoir comprising a pan having an inlet for receiving water from said reservoir and a discharge outlet in the bottom of said pan, said inlet and discharge outlet being spaced to provide a gravity flow path along a heating element, said discharge outlet comprising a standpipe for providing a level of water at said heating element sufficient to provide good thermal transfer between the heating element and said water, temperature sensing means for controlling the temperature of the water being heated by said unit comprising an elongated generally flat bimetallic sensing element above said pan and valve means comprising a movable valve member and a cooperating valve element, said movable valve member being on one end of said bimetallic sensing element and movable toward and away from the bottom of said reservoir to control the effective flow area of said valve means, said valve means controlling the flow of water from said reservoir to said inlet.

27. An apparatus as defined in claim 26 wherein said temperature sensing element is exposed to vapors from water flowing through said heating unit to provide an effective heat transfer to the temperature sensing element.

28. A water heating apparatus comprising a flow-through heating unit for receiving water which is to be heated while it flows through the heating unit, said heating unit comprising a member defining a pan having a portion providing the inlet to the unit and a discharge outlet horizontally spaced from and below the inlet to define a generally horizontal flow path for heating the water as it flows through the unit, the water flowing from said inlet along said pan to said outlet and being discharged by gravity flow and an electrically energizable rod-like heating element disposed in said pan and exposed to said water for heating the unheated water as it flows through said heating unit along said flow path and is discharged at said outlet, said discharge outlet comprising a standpipe which operates to maintain a water level in said pan against said heating element for efficient heating while the water is flowing therethrough, said pan has a restricted opening in the area of said standpipe to provide a continuous flow from and drainage for the pan.

29. An apparatus as defined in claim 28 wherein said apparatus includes a reservoir for supplying water to said unit and said pan forms a well having said heating element located in the lower portion thereof and the inlet to said heating unit comprises a substantially horizontal flow channel extending outwardly from the top of the well to receive water from said reservoir.

30. A water heating apparatus comprising a flow-through heating unit for receiving water which is to be heated while it flows through the heating unit, said heating unit comprising a member defining a pan having a portion providing the inlet to the unit and a discharge outlet horizontally spaced from and below the inlet to define a generally horizontal flow path for heating the water as it flows through the unit, the water flowing from said inlet along said pan to said outlet and being discharged by gravity flow and an electrically energizable rod-like heating element disposed in said pan and exposed to said water for heating the unheated water as it flows through said heating unit along said flow path and is discharged at said outlet, said discharge outlet comprising a standpipe which operates to maintain a water level in said pan against said heating element for efficient heating while the water is flowing therethrough, said heating element being disposed in said pan spirally around said standpipe.

31. An apparatus as defined in claim 30 wherein said apparatus includes a reservoir for supplying water to said unit and said pan forms a well said heating element located in the lower portion thereof and the inlet to said heating unit comprises a substantially horizontal flow channel extending outwardly from the top of the well to receive water from said reservoir.

32. A water heating apparatus comprising a reservoir for holding water to be heated, a flow-through heating unit for receiving water which is to be heated while it flows through the heating unit, said heating unit comprising a member defining a pan having a portion providing the inlet to the unit and a discharge outlet horizontally spaced from and below the inlet to define a generally horizontal flow path for heating the water as it flows through the unit, the water flowing from said inlet along said pan to said outlet and being discharged by gravity flow and an electrically energizable rod-like heating element disposed in said pan and exposed to said water for heating the unheated water as it flows through said heating unit along said flow path and is discharged at said outlet, and means for controlling the flow of water to said inlet from said reservoir to control the temperature to which the water is heated by said heating unit comprising a valve element having an aperture therein to permit a restricted continuous flow to said unit and operable to increase the flow to control the temperature to which the water is heated as it flows through said unit.

33. An apparatus for use in brewing coffee, said apparatus comprising reservoir means for holding a supply of water to be heated, a flow-through heating unit disposed beneath said reservoir means for receiving a flow of water from said reservoir and for heating the water as it flows through said heating unit under the influence of gravity, and coffee brewing means disposed below said heating for receiving hot water from said heating unit, said flow-through heating unit comprising a member defining a pan having an upper portion providing the inlet to the unit and a discharge outlet horizontally spaced from and below the inlet to define a generally horizontal flow path along which the water is heated as it flows through the unit under the influence of gravity, an electrically energizable rod-like heating element disposed in said pan and exposed to the flow of water for heating the unheated water as it flows through said heating unit along said flow path and is discharged at said outlet, and means for limiting the level of water accumulated in said pan during the flow of water through said pan to a predetermined maximum level which is below said upper portion of said pan and above at least a portion of said rod-like heating element.

34. An apparatus as defined in claim 33 wherein said discharge outlet comprises a standpipe which operates to maintain a water level in said pan against said heating element for efficient heating while the water is flowing therethrough.

35. In a water heating unit, a reservoir for holding a quantity of water to be heated, a heating unit for heating water received from said reservoir, said heating unit including a container means for holding water received from said reservoir, a heating element for heating the water, mounting means for mounting said heating element in said container means, a thermostatic switch for de-energizing said heating element when the temperature exceeds a predetermined magnitude indicating a lack of water in the heating unit, means supporting said thermostatic switch in position to be cooled by water entering said heating unit from said reservoir, and a heat conductive member disposed in abutting engagement with said heating element at a location spaced from said mounting means for transferring heat from the heating element directly to said thermostatic switch.

36. An apparatus for heating water comprising a reservoir for receiving a quantity of water to be heated, a heating unit for receiving water from said reservoir and having a gravity flow path within the unit to a discharge outlet, temperature sensing means for controlling the temperature of the water being heated by said unit comprising a bimetallic sensing element above said flow path, the water flow from said reservoir to said heating unit being controlled by valve means comprising a movable valve member actuatable by the sensing element to control the flow from said reservoir to said heating unit, said valve member cooperating with a discharge outlet for said reservoir and being disposed at one end of said bimetallic sensing element, said bimetallic sensing element comprising a bimetallic portion extending from said one end to one side of said discharge outlet to be out of the flow of water from said discharge outlet to said heating unit and to be exposed to water vapor from said heating unit.

37. An apparatus as set forth in claim 36 further including a rod-like heating element along said flow path and exposed directly to contact with water flowing along said flow path.

38. An apparatus for heating water comprising a reservoir for receiving a quantity of water to be heated, a heating unit for receiving water from said reservoir and having a gravity flow path to a discharge outlet, and temperature sensing means for controlling the temperature of the water being heated by said unit, said temperature sensing means comprising a temperature responsive element and valve means for controlling the flow of water from said reservoir to said heating unit, said valve means being actuatable by said temperature responsive element to control the flow of water from said reservoir to said heating unit, said temperature responsive element having a major portion thereof disposed out of the path of controlled water flow from said reservoir to said heating unit.

39. An apparatus as set forth in claim 38 wherein said heating unit comprises a rod-like heating element along said gravity flow path in said heating unit, said rod-like heating element being exposed directly to contact with water flowing along said gravity flow path.

40. An apparatus as set forth in claim 38 wherein said heating unit includes a container having a bottom wall connected with said discharge outlet and an upper portion disposed adjacent said reservoir, an electrically energizable heating element disposed adjacent said bottom wall, and means for limiting the level of water accumulated in said container during the flow of water along said gravity flow path to a level which is below said upper portion of said container and above said heating element.

41. An apparatus as set forth in claim 40 wherein said means for limiting the level of water comprises a standpipe extending upwardly from said bottom wall of said container.

42. An apparatus as set forth in claim 38 wherein said valve means includes surface means for defining an aperture to permit a restricted continuous flow of water from said reservoir to said heating unit as long as there is water in said reservoir.

43. An apparatus as described in claim 42 wherein valve means includes a valve part which is movable by said temperature responsive element, said aperture being formed in said valve part.

44. Apparatus as described in claim 38 wherein said reservoir has a discharge oulet, said valve means includes a valve part which is movable by said temperature responsive element to increase the effective flow area of said reservoir discharge outlet in response to a sensing of an increase in temperature by said temperature responsive element.

45. An apparatus as set forth in claim 38 wherein said valve means includes a laterally translatable part, said temperature responsive element being a bimetallic element for actuating said valve part to effect translation thereof.

46. An apparatus as set forth in claim 38 wherein said valve part is carried by one end of said bimetallic element.

47. An apparatus as set forth in claim 38 wherein said valve part is integral with said bimetallic element.

48. An apparatus as set forth in claim 38 wherein said temperature responsive element is disposed above said heating unit and exposed to water vapor from said heating unit.

49. An apparatus as set forth in claim 38 wherein said heating unit comprises a rod-like heating element disposed along said gravity flow path to have direct contact with water flow along said gravity flow path, said temperature responsive element being directly exposed to said rod-like heating element.

50. An apparatus for heating water comprising a reservoir for receiving a quantity of water to be heated, a heating unit for receiving water from said reservoir and having a gravity flow path to a discharge outlet, and temperature sensing means for controllng the temperature of the water being heated by said unit, said temperature sensing means comprising a bimetallic sensing element disposed above said heating unit with at least a major portion of said bimetallic sensing element disposed out of the path of flow of water from said reservoir to said heating unit and exposed to water vapor from said heating unit, and valve means for controlling the flow of water along a path from said reservoir to said heating unit, said valve means comprising a movable valve part connected with said bimetallic sensing element and actuatable by said bimetallic sensing element to control the flow of water from said reservoir to said heating unit.

* * * * *

UNITED STATES PATENT OFFICE
CERTIFICATE OF CORRECTION

Patent No. 4,000,396   Dated December 28, 1976

Inventor(s) Edmund A. Abel, Jr.

It is certified that error appears in the above-identified patent and that said Letters Patent are hereby corrected as shown below:

Column 14, line 45, after "heating" insert -- unit --.

Signed and Sealed this

Thirty-first Day of May 1977

[SEAL]

Attest:

RUTH C. MASON
*Attesting Officer*

C. MARSHALL DANN
*Commissioner of Patents and Trademarks*